United States Patent [19]

van Raamsdonk

[11] Patent Number: 4,475,239
[45] Date of Patent: Oct. 2, 1984

[54] APPARATUS FOR TEXT EDITING AND PROCESSING

[75] Inventor: Cornelis van Raamsdonk, Adelebsen, Fed. Rep. of Germany

[73] Assignee: Olympia Werke AG, Wilhelmshaven, Fed. Rep. of Germany

[21] Appl. No.: 396,134

[22] Filed: Jul. 7, 1982

[30] Foreign Application Priority Data

Jul. 8, 1981 [DE] Fed. Rep. of Germany ....... 3126886

[51] Int. Cl.³ .......................... G06K 9/00; G06F 3/00
[52] U.S. Cl. ................................ 382/57; 340/365 R; 340/707; 364/900; 382/59
[58] Field of Search ...................... 382/48, 57, 61, 58, 382/59; 340/707, 708, 365 P, 365 A, 365 S, 365 R; 178/18, 19, 30; 364/200, 900

[56] References Cited

U.S. PATENT DOCUMENTS

| | | | |
|---|---|---|---|
| 3,292,489 | 12/1966 | Johnson et al. | 340/707 |
| 3,760,373 | 9/1973 | Bartz | 340/707 |
| 3,761,877 | 9/1973 | Fernald | 178/19 |
| 4,058,849 | 11/1977 | Fitzgerald et al. | 340/365 R |
| 4,190,833 | 2/1980 | Bejting et al. | 340/707 |
| 4,238,792 | 12/1980 | Cohen et al. | 340/707 |
| 4,329,684 | 5/1982 | Monteath et al. | 340/707 |
| 4,370,645 | 1/1983 | Cason et al. | 340/709 |

OTHER PUBLICATIONS

Matsushita et al., "Personal Computer-aided Composition and Editing System", 3rd USA-Japan Computer Conference Proceedings, pp. 56–60, Oct., 1978, San Francisco.

Primary Examiner—Leo H. Boudreau
Attorney, Agent, or Firm—Spencer & Frank

[57] ABSTRACT

Apparatus for editing and processing a text printed on a record carrier, composed of a memory for storing representations of the next characters and of function information relating to the text, a control unit connected for controlling transfer of representations to and from the memory; and a text editing unit composed of a digitalization panel presenting a surface for receiving the record carrier and including a circuit connected to the control unit for producing signals representing the location of elemental regions on the surface, and an input pen for placing markings on the record carrier and for actuating the signal producing circuit to produce signals representing the location of each elemental region contacted by the pen. The control unit is arranged to receive the signals produced by the signal producing circuit, to convert those signals. into control signals, to associate such control signals, on the basis of the locations of the elemental regions represented by the signals produced by the signal producing circuit, with text character representations in the memory, and to use such control signals to control transfer of representations to and from the memory.

11 Claims, 7 Drawing Figures

APPARATUS FOR TEXT EDITING AND PROCESSING

BACKGROUND OF THE INVENTION

The present invention relates to an apparatus for printing a text on a record carrier and provided with a memory for aiding editing and processing of the text.

Apparatus of this type is known as a word processor and offers a multitude of possibilities for producing, editing and processing texts, such as, for example, automatic error correction, erasure and insertion of text portions, rearrangement of text portions, automatic word separation, margin and format controls, use of stored text paragraphs and phrases, etc.

One drawback of these known systems is their complicated operation, which requires a lengthy learning process and continuous practice. Text editing which extends over the entire page, e.g. rearrangement, format changes and filling out forms, is additionally more difficult in that only a small portion of the page being typed into the system can be seen. In word processors employing a screen, and which thus do not have the last-mentioned drawback, operation is very tiring.

SUMMARY OF THE INVENTION

It is an object of the present invention to provide a novel apparatus for editing and processing texts which reduces the above drawbacks in that it is simple to operate and easy to understand and learn.

The above and other objects are achieved, according to the present invention, by the provision of apparatus for editing and processing a text printed on a record carrier, which apparatus includes a memory for storing representations of the text characters and of function information relating to the text, a control unit connected for controlling transfer of representations to and from the memory, and text editing means composed of a digitalization panel presenting a surface for receiving the record carrier and including means connected to the control unit for producing signals representing the location of elemental regions on the surface, and an input pen for placing markings on the record carrier and for actuating the signal producing means to produce signals representing the location of each elemental region contacted by the pen. The control unit is arranged to receive the signals produced by the signal producing means, to convert those signals into control signals, to associate such control signals, on the basis of the locations of the elemental regions represented by the signals produced by the signal producing means, with text character representations in the memory, and to use such control signals to control transfer of representations to and from the memory.

The present invention constitutes a basically new approach to a text editing and processing apparatus with a novel interface between operator and machine and offers a series of considerable advantages which, by analogy to the known term "computer aided design", could be called "computer text design." In spite of the possiblility of performing all conceivable text editing and processing operations, including graphic illustrations, operation of the machine can be learned very easily. In contradistinction to prior art devices, no instruction code keys need be used in a set sequence and all correction and change operations can be performed manually in the manner in which an author changes a proof with his pencil. It is even possible to use the correction symbols known in the graphic art to make the desired corrections and changes.

Not only while it is being originally created, but also for the correction and editing measures, the original text is visible in its entirety, including the text elements, its form and context, and the corrections drawn in remain visible. The viewing field here corresponds to the full page screen of a word processor but without its exacting and fatiguing operation and without requiring the relatively difficult learning of the operating functions.

According to advantageous embodiments, it is sufficient to provide a simple typewritter keyboard for example according to the DIN standard [German Industrial Standard] with which any typist is familiar.

A particularly compact apparatus results if the printing or typing mechanism is arranged as a coordinate printer above the panel. An ink printer is of particular advantage in this connection because it makes the recordings without impact stresses on the panel.

If a mosaic printer is used, any desired graphic representations become possible including the possibility of internally effecting the necessary calculations or calculations depending therefrom.

Further advantages of the invention will become evident from the drawings and the description of an embodiment which follows below.

DESCRIPTION OF THE PREFERRED EMBODIMENTS

Figure 1:
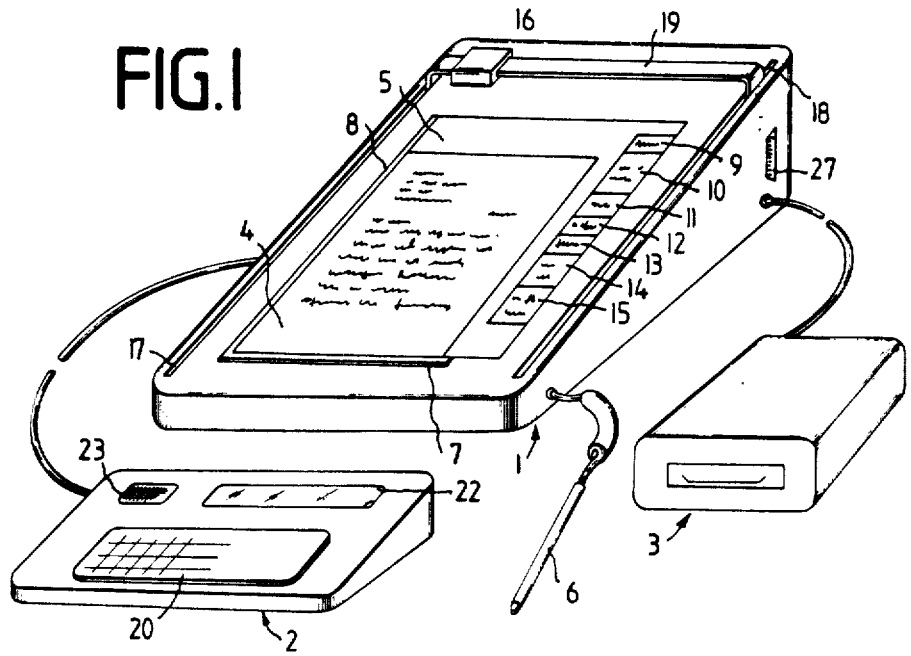
FIG. 1 is a perspective view of one embodiment of the invention.

The system shown in FIG. 1 includes a digitalizing and writing device 1, an operating console 2 and a data storage device 3 with a removable data carrier. Units 1, 2 and 3 are operatively interconnected via connecting cables and consist essentially of the function blocks shown in FIG. 2.

The desk-like contact surface of the digitalization and writing device 1, which in FIG. 1 is covered by a record carrier, i.e. a sheet of paper, 4 containing writing - e.g. a letter -, is formed by a digitalization panel 5. When the record carrier 4 rests on panel 5 and is touched by the tip of an input pen 6 operatively connected with the device, the panel generates coordinate signals which indicate the position of the respective point of contact. The input pen 6 has a writing tip - somewhat comparable to a ballpoint pen - so that points of contact can be visibly marked on the paper. Such digitalization indicator boards with writing input pens are known per se and will therefore not be described in detail here. A suitable, known digitalization panel is the Bit Pad One, manufactured by Summagraphics, Fairfield, Conn.

Two abutment strips 7 and 8 arranged at right angles to one another assure placement of the record carrier 4 on the digitalization panel 5 at a defined location. At the right edge of the digitalization panel 5, individual regions 9 to 15 are provided to allow for the input of information by touching a selected one of those regions with the input pen 6. Each of individual regions 9 through 15 is provided with a legend or symbol indicating its function and the region may have different sizes, depending on their frequency of use and significance. Given functions are associated with the coordinate signals of each of regions 9 through 15 which can be generated by contact with the input pen 6 so that the effect is that of input keys.

Above the digitalization panel 5, an ink printing head 16 is mounted on a guide bar 19 to be displaceable in both coordinate directions, the guide bar 19 being guided in guide slots 17 and 18, and thus being able to reach any point on the digitalization panel 5. With this arrangement, the record carrier placed on the digitalization panel 5 can be covered with writing, an ink jet printing mechanism being particularly advantageous because printing takes place without impact and the digitalization panel will thus not be damaged.

The operating console 2 has an alpha-numeric and function keyboard 20, e.g. a conventional standard typewriter keyboard which may have the design known for text editing and processing devices. It further includes a line display device 22 on which instructions from the operator, references to guide the operator or the changes produced by the instructions fed in, e.g. in a given text, can be made visible. Next to it there is a loudspeaker 23 of a voice output device, or synthesizer, 24 (FIG. 2) through which instructions can also be given to the operator.

Figure 2:
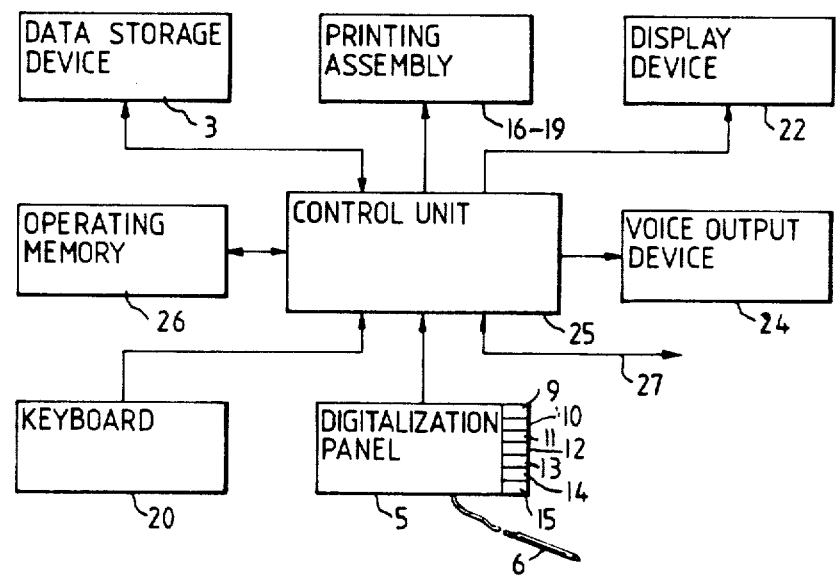
FIG. 2 is a block circuit diagram of an operating circuit for the embodiment of FIG. 1.

As can further be seen in FIG. 2, the internal control of the function sequences and of the interaction of the individual modules is performed by a control unit 25 which may be formed, for example, by a microcomputer. A data memory serving as the operating memory 26 serves to record the data fed in via the keyboard 20 or the digitalization panel 5 and which can be transferred for the purpose of storage to a data carrier of the data storage device 3. The data storage device in this case is a diskette device whose diskettes are interchangeable and storable. Additionally, data from the operating memory 26 can be fed via a long-distance data transmitting interface 27 to a telephone line and can be transmitted to a remote receiver or data can be received from there.

To produce a text, for example a letter, the operator first places a record carrier, i.e. a sheet of letter paper, on the digitalization panel 5 so that it contacts the abutment strips 7 and 8. Through the keyboard 20 of the operating console 2 the operator first feeds in the control instructions required to produce the text. These can include, for example, setting the ink printer to the desired position where the text is to start, etc. The keyboard is also used for the inputting of text data. The operator may here possibly be assisted or guided by instructions on the display device (e.g. "put in starting position").

The put-in data reach the operating memory 26 in coded form and are simultaneously recorded on the record carrier 4 by means of the ink printing head 16 which is moved into its respective recording position by actuating signals from the control unit 25 and is actuated to generate the desired character. Information regarding the respective column and row position of each put-in data character on the record carrier 4 is also stored in the operating memory 26.

During formation of the text on the record carrier 4, the operator can observe the text being created in its entirety; this is possible otherwise only on word processors having whole-page screens.

After recording the last character on the page, a return instruction causes the ink printing head 16 to return to the illustrated rest position so that the entire record carrier 4 is freely accessible. The operator can now make all desired error corrections and editing changes on the digitalization panel 5 with the aid of the input pen 6. Certain of these operations will be described with reference to FIG. 3.

As a first step, the operator should touch the touch key region 9 which is marked with the legend "Align" with his input pen 6 and then mark, e.g. with a cross 21 one or a plurality of text characters on the record carrier 4 to identify the overall position of the text on the digitalization panel 5. On the basis of the coordinate signals of the touched region 9, the control unit 25 causes the coordinate signals generated by the markings 21 to internally associate positions on the panel with the data stored in the operating memory 26. In this way it is accomplished that the position information is securely associated in the operating memory 26 with the position of the text characters on the record carrier 4 even if the record carrier 4 has been removed from the digitalization indicator board 5 and has not been replaced in precisely the same position, or if the carrier was printed on another printing mechanism and is now to be processed further, after reading of its stored text data into the operating memory 26, on the digitalization panel 5. It is prudent to mark three text characters for position identification, perhaps the first character in the first line, the first character in the last line and the last character in the last line, as shown.

Based on information identifying the distance between the first and last lines as well as the number of lines, obtained from the operating memory 26, the control unit 25 can then determine the line spacing. Similarly, based on the distance between the first and last characters in the last line and the number of characters and spaces, likewise obtained from the operating memory 26, the control unit can then determine the column spacing so that a record carrier can be processed which has been produced on another printing mechanism with a different spacing of columns and rows. By marking a plurality of characters it is also possible to detect a possible angular offset of the newly inserted record carrier which can then be eliminated.

All subsequent text processing markings entered on the record carrier 4 can now be associated in context with the precise position of the text in the operating memory 26.

For example, a word is to be removed from the first line of the text. The operator crosses out this word with a line 28 and touches the region 10 marked "Erase", both operations being performed by pen 6, whereupon the word is erased from the operating memory 26 and the stored text is shifted so that the resulting gap is filled.

At another point, text is to be inserted. After entering the processing marking 29, the operator touches the region 11, marked "Insert". The operator then keys in the text to be inserted on the operating console 2 and then touches region 11 a second time. The keyed-in text is then inserted in the operating memory 26 at the marked point after the original memory contents has been shifted accordingly.

Now part of a line is to be removed and inserted at another place. For this purpose, the operator need only identify the text to be moved by applying a processing marking 30, and will then touch region 12 marked "Re-arrange", and finally enter a processing marking 31 at that point where the text is to be inserted.

By marking in a vertical line 32 and then touching the region 13 "Right Margin", an uneven margin can be rectified, i.e. to convert a wavy margin into a straight one, or the margin can be moved. Similarly, by touching region 14 marked "Left Margin" after drawing in a vertical line the left margin can be shifted accordingly.

To avoid mixups with text processing markers, these vertical lines 32 are advisably entered above the level of the text. The above-described text editing sequences indicated by text editing markers constitute only a few examples. In addition, a multitude of other text editing and processing sequences are conceivable and possible and can be effected in this manner.

A considerable operating simplification can be realized by arranging for the nature of the particular processing to be performed to be identified merely by the particular shape of the markers placed on the record carrier 4 by means of the input pen 6. The coordinate signals generated by the digitalization panel 5 then constitute an image of the text editing markers and can be evaluated by the control unit 25 for the performance of the requested processing. In this case, the additional input of processing instructions via the touch key regions 9 through 15 would not be required and their number could be limited to a few for actuating major functions (e.g. "text correction", "text storage ", "long-distance data transmission", etc.). Some of the processing markers shown in FIG. 3, the example, would already be suitable to be evaluated for actuation of a defined function so that here already the respective touch key regions would not have been absolutely necessary. Advisably such a solution employs the correction markings customary in the graphic arts as the text editing markers.

It is also possible to associate memory regions with individual touch-key regions of the digitalization panel 5 where phrases of text, standard texts, etc. are stored and can be called out by touching the respective touch-key region in such a manner that the control unit 25 actuates the ink printing head 16 to produce these texts. When use is made of a grid printing head which is able to produce variable graphic designs, such as the ink printing head 16 provided in the illustrated embodiment, symbols may also be associated with a touch-key region.

The position of touch-key regions as well as the functions to be actuated thereby can also be defined by the user himself, depending on the field of use and personal requirements. For this purpose, an internal program may be provided which - once it has been called up - associates the data put in from a diskette, a special customer memory module or via the keyboard 20, 21 with regions on the digitalization panel 5 which were marked with the input pen 6.

It is also conceivable, for example, after initializing the above-mentioned program routine, to approach the intended regions with the ink printing head 16 and to mark them on the record carrier placed on the panel, and by input of the writing, including text and/or symbols, and possibly corresponding information, to associate a function with each marked region, the program routine causing the transfer of these determinations to the control unit 25. The parts of the record carrier carrying writing could then be applied on the digitalization panel and the touch-key regions could be identified. The control unit 25 can also be additionally designed so that graphic representations, e.g. curves, diagrams, etc., which were drawn by means of the input pen 6 on a record carrier resting on the digitalization panel, are stored in the operating memory according to the generated coordinate signals. By putting in the appropriate function instructions, for example to determine area contents and the like, the control unit 25 can perform editing work and the printing mechanism can write out the graphic representations, an edited version or an editing result.

All suitable instructions for the operator, for example confirmation of successful actuation of one of the touch-key regions 9 through 15, requests for input of further function instructions or further text data, etc., can be displayed on the display device 22 or played out acoustically via the loudspeaker 23 in the form of audio or voice signals, if suitable and if such devices are provided. It is not absolutely necessary to constitute all function keys provided for operation of the digitalization panel 5 by way of touch regions on the digitalization and writing device 1; some or all of such keys can also be disposed on the operating console 2.

Finally, the above described division into three individual devices which are connected together by means of cables is also not absolutely necessary. The printing mechanism could be provided, for example, as an independent device which is connected with the rest of the instrument by means of cables. All separately shown devices could be accommodated in a single housing or any other desired arrangement could be made.

Figure 3:
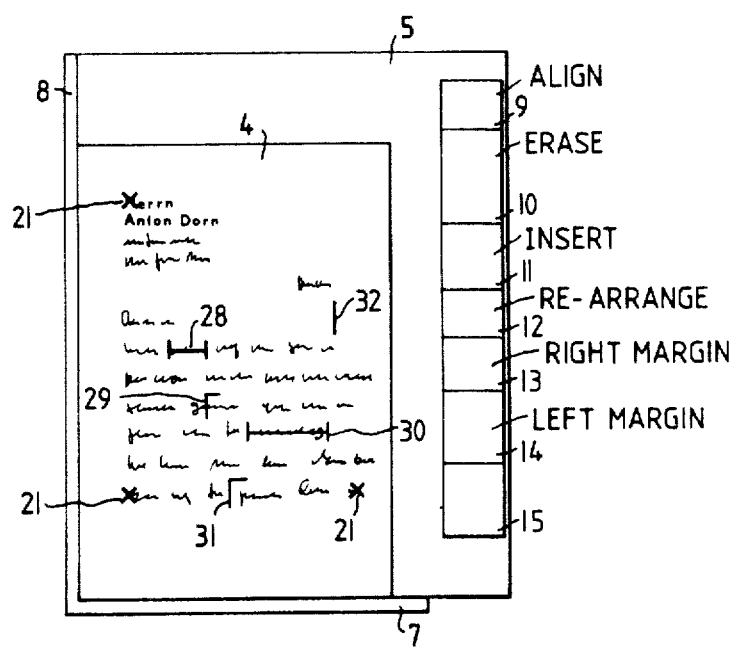
FIG. 3 is a detail view of part of FIG. 1.

The flow diagrams of FIGS. 4, 5, 6 and 7 consist of decision blocks and function blocks and illustrate essentially the sequences of operations as described in connection with FIG. 3. It is assumed that the operator has newly inserted a record carrier 4 for the purpose of error corrections and editing changes. The text printed on the record carrier 4 is stored in the operating memory 26.

Figure 4:
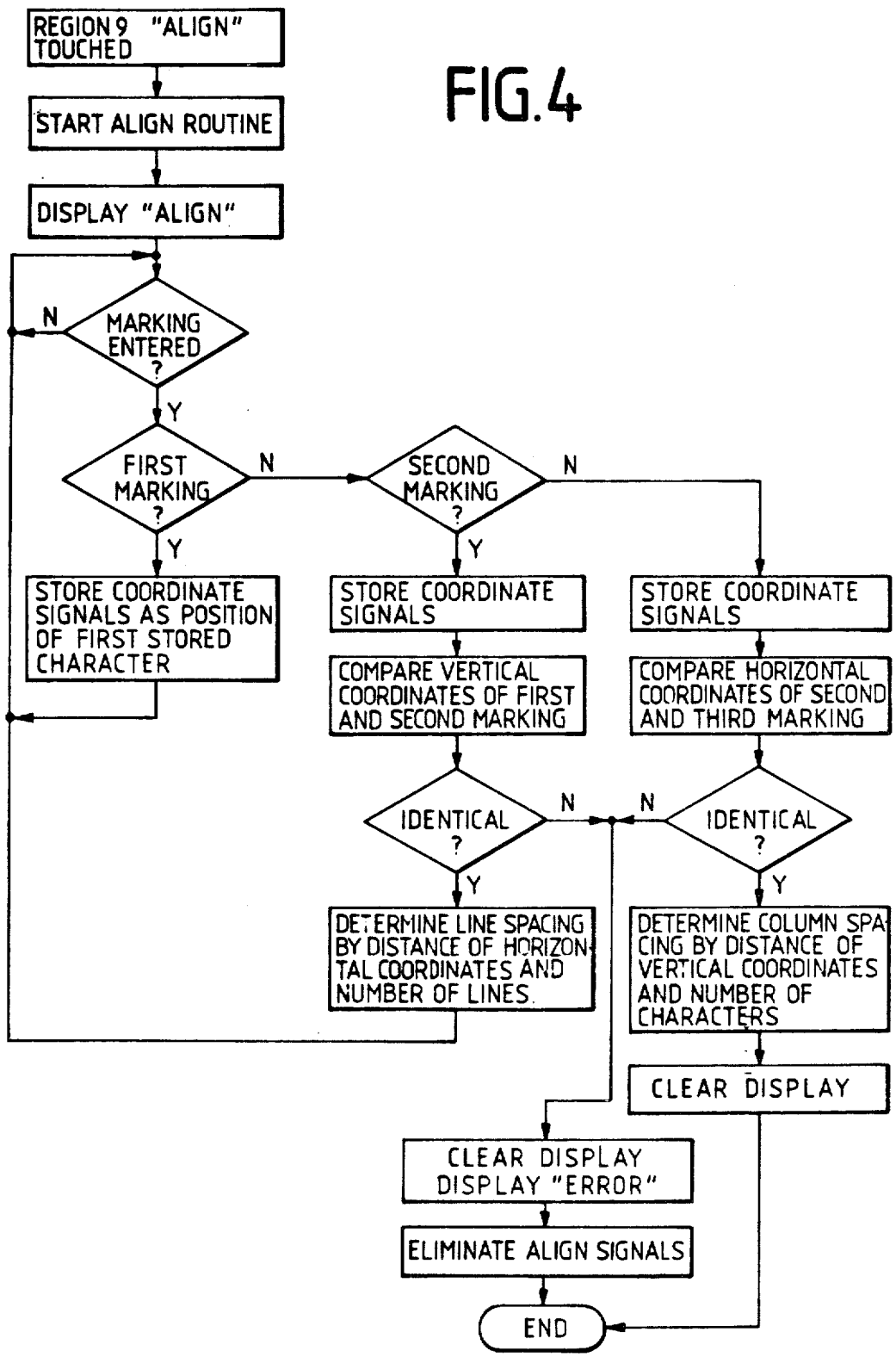
FIGS. 4 to 7 are flow diagrams of functions explained in connection with FIG. 3.

The flow diagram of FIG. 4 illustrates the sequence of operations when the record carrier 4 is aligned with respect to the stored text representations in the operating memory 26. Three aligning marks are entered with the input pen 6 and the control unit 25 checks by comparing the respective coordinates whether the record carrier 4 is correctly inserted. If the record carrier 4 is not correctly inserted with its text columns and lines running parallel to the abutment strips 7, 8, an error indication will be generated and displayed on the display device. If it is correctly inserted the control unit 25 generates position information in order to associate the text on the panel 5 with the text representations stored in the operating memory 26. Furthermore the line spacing and column spacing are computed on the basis of the distance of the aligning marks derived from the respective coordinates and the number of lines and characters in the operating memory thereby allowing to eliminate differences between the line and column spacing on the record carrier 4 and the stored text.

After the aligning is completed all further operations may take place.

Figure 5:
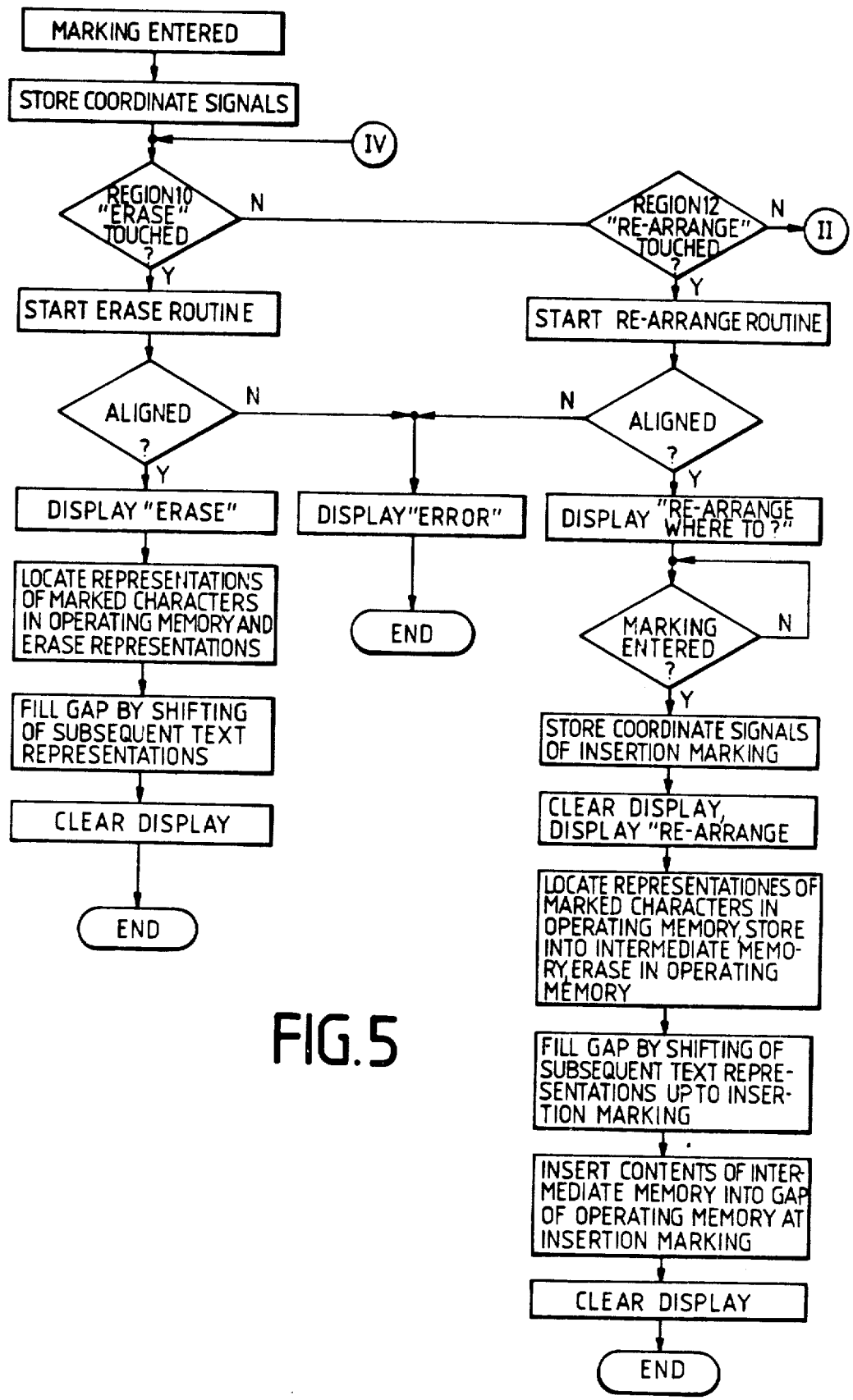

The flow diagram of FIG. 5 illustrates the sequence of one of these operations in its left branch, namely the erasure of text, and another one of these operations in its right branch, namely the re-arrangement of text. In the erase routine a part of the text marked by the operator on the panel 5 is cancelled in the operating memory 26 and the thereby arising gap is automatically filled up by the subsequent, not cancelled text. In the re-arrange routine the stored part of text marked by the operator is transferred to a portion of the operating memory 26 serving as intermediate memory, the gap is filled by shifting the subsequent text representations up to a destination mark 31 defining the position where the transferred text is to be inserted and the contents of the intermediate memory is transferred to the insertion position.

Figure 6:
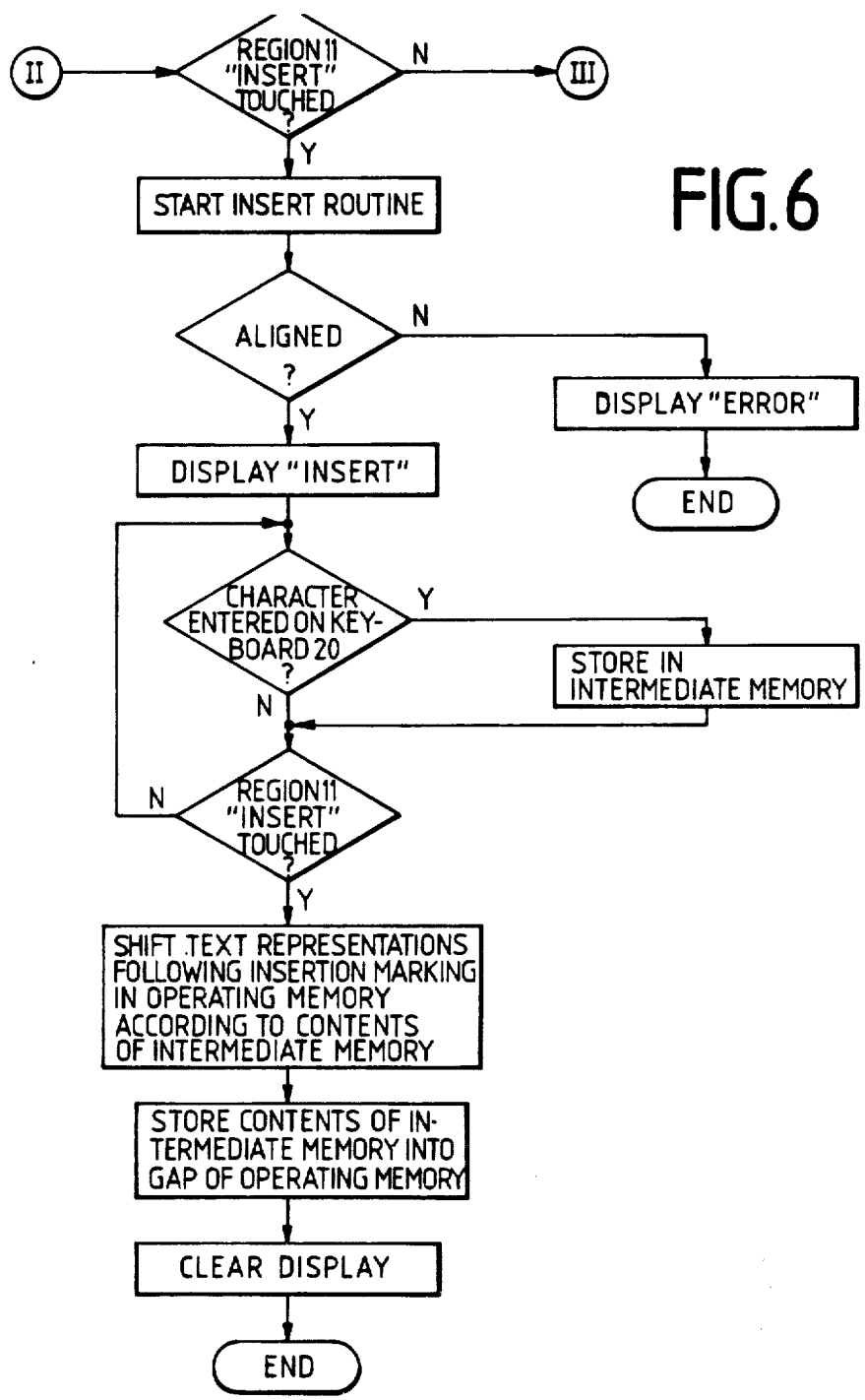

The flow diagram of FIG. 6 illustrates the sequence of operations when one or more characters are to be newly inserted at a position in the stored text marked by the operator on the panel 5. All via keyboard 20 newly entered characters are stored in the intermediate memory portion of the operating memory 26, the text in operating memory 26 following the insertion mark is shifted to create a gap according to the number of entered characters and the contents of the intermediate memory is transferred to the insertion position thereby filling the gap.

Figure 7:
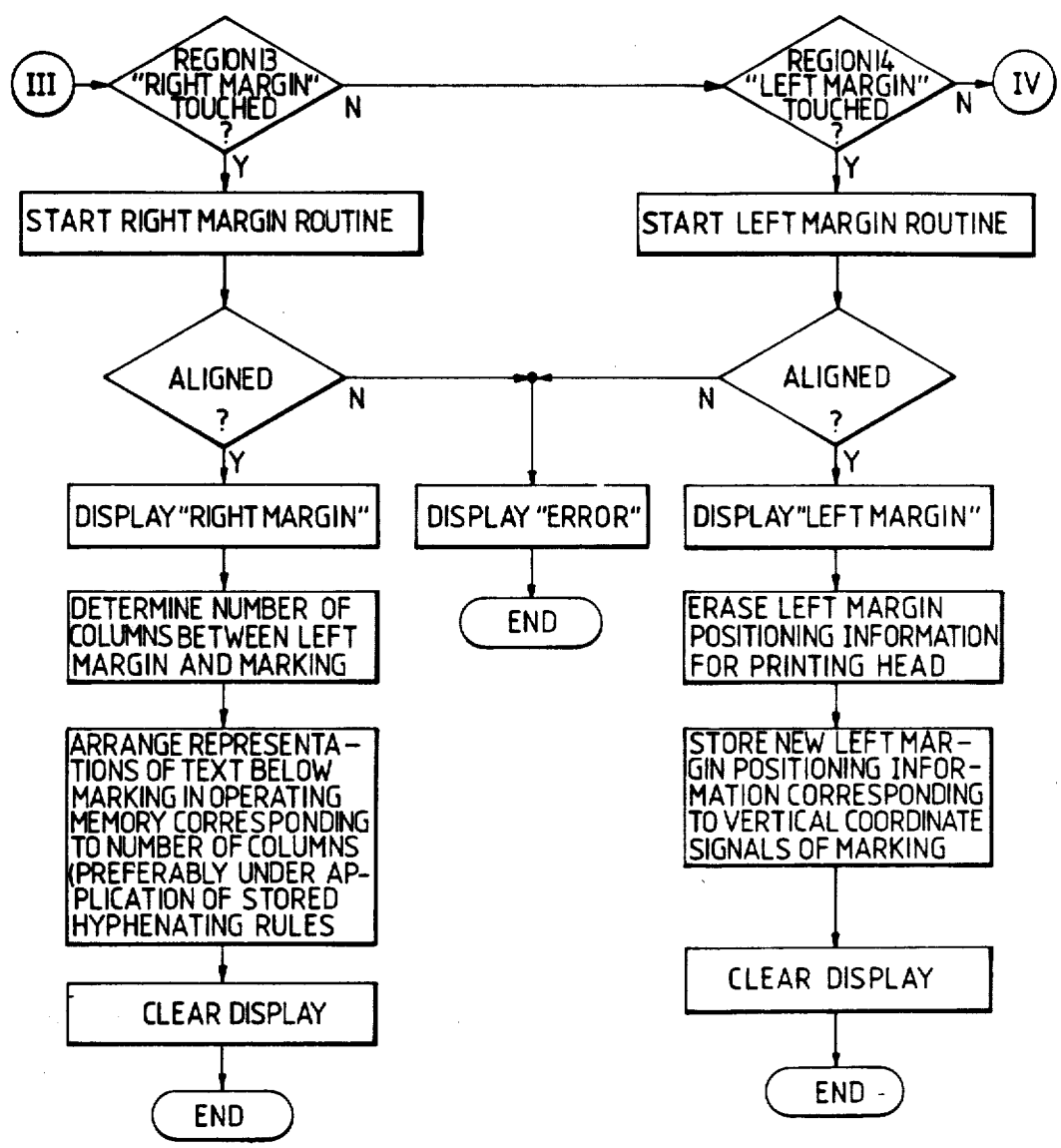

The flow diagram of FIG. 7 illustrates the sequence of operations when the right and left margin as printed on the record carrier 4 and stored in the operating memory 26 are to be altered. In the right margin routine the stored character representations are arranged in text lines of a length according to the number of columns between the existing left margin and the vertical coordinates of the mark defining the new right margin. If a hyphenating routine is provided for the new arranging of the text has to take place under application of the hyphenating rules. Hyphenating routines are well known in the field of text processing machines and are therefore not described in detail here. In the left margin routine the position information for positioning the printing head for a new printout of the text is cancelled in the operating memory 26 and a new position information derived from the vertical coordinates of the left margin marking applied to the record carrier 4 on the panel 5 is stored instead.

A suitable device which could be used as the control unit 25 for accomplishing the control sequences is the microprocessor Z80 manufactured by Zilog Inc., Los Altos, Calif.

Suitable mechanisms for displacing the printing head 16 in coordinates across a record carrier are also well known per se, especially in the technical field of plotting apparatus, for example the plotter 7203A, manufactured by Hewlett-Packard Co., Palo Alto, Calif.

It will be understood that the above description of the present invention is susceptible to various modifications changes and adaptations, and the same are intended to be comprehended within the meaning and range of equivalents of the appended claims.

What is claimed is:

1. Apparatus for editing and processing a text printed on a record carrier, comprising: a memory for storing representations of the text characters and of function information relating to the text; a control unit connected for controlling transfer of representations to and from said memory; and text editing means composed of a digitalization panel presenting a surface for receiving the record carrier and including means connected to said control unit for producing signals representing the location of elemental regions on the surface, and an input pen for placing markings on the record carrier and for actuating said signal producing means to produce signals representing the location of each elemental region contacted by said pen; wherein said control unit is arranged to receive the signals produced by said signal producing means, to convert those signals into control signals, to associate such control signals, on the basis of the locations of the elemental regions represented by the signals produced by said signal producing means, with text character representations in said memory, and to use such control signals to control transfer of representations to and from said memory.

2. Apparatus as defined in claim 1 wherein said control unit produces a control sequence by which after application of a marking to a record carrier by said pen, the resulting signals produced editing markings, by said signal producing means are used to bring the position of the text on the record carrier on said digitalization panel into coincidence with the position of the text character representations in said memory.

3. Apparatus as defined in claim 1 or 2 further comprising a keyboard connected to said control unit for the input of representations of text characters.

4. Apparatus as defined in claim 3 wherein a portion of said digitalization panel is composed of delineated regions associated with said signal producing means in such a manner that pressure on each said delineated region by said pen results in production by said signal producing means of a signal constituting a representation of function information.

5. Apparatus as defined in claim 1 further comprising a printing mechanism connected for printing a text corresponding to character representations stored in said memory.

6. Apparatus as defined in claim 5 wherein said mechanism comprises a printing head and means supporting said head above said panel for movement across the portion of said panel surface provided to receive the record carrier in two mutually perpendicular directions for permitting said printing head to print text material on the record carrier.

7. Apparatus as defined in claim 6 wherein said printing head is an ink printing head.

8. Apparatus as defined in claim 5 wherein said pen can place on the record carrier markings having a form to constitute graphic representations, and said control unit operates to deliver signals representing such graphic representations from said signal producing means to said memory and to cause said printing mechanism to print graphic representations on a record carrier on the basis of representations thereof stored in said memory.

9. Apparatus as defined in claim 5 or 8 wherein said pen can place on the record carrier markings having a form to constitute graphic representations, and said control unit operates to process signals produced by said signal producing means and representing such graphic representations and to cause said printing mechanism to print graphic representations on a record carrier on the basis of the processed signals.

10. Apparatus as defined in claim 1 further comprising a display device connected to said control unit for visually displaying information based on signals provided by said signal producing means.

11. Apparatus as defined in claim 1 further comprising a voice synthesizer connected to said control unit for producing audible announcements identifying text editing instructions.

* * * * *